(12) United States Patent
Han

(10) Patent No.: US 8,624,837 B1
(45) Date of Patent: Jan. 7, 2014

(54) METHODS AND APPARATUS RELATED TO A SCRATCH PAD REGION OF A COMPUTING DEVICE

(75) Inventor: Amy Han, Palo Alto, CA (US)

(73) Assignee: Google Inc., Mountain View, CA (US)

(*) Notice: Subject to any disclaimer, the term of this patent is extended or adjusted under 35 U.S.C. 154(b) by 330 days.

(21) Appl. No.: 13/073,306

(22) Filed: Mar. 28, 2011

(51) Int. Cl.
*G09G 5/08* (2006.01)

(52) U.S. Cl.
USPC .......................................... 345/157; 345/173

(58) Field of Classification Search
USPC .................................. 345/156, 157, 173–179
See application file for complete search history.

(56) References Cited

U.S. PATENT DOCUMENTS

| | | | |
|---|---|---|---|
| 5,481,278 A | 1/1996 | Shigematsu et al. |
| 5,495,077 A | 2/1996 | Miller et al. |
| 5,764,218 A | 6/1998 | Della Bona et al. |
| 5,821,922 A | 10/1998 | Sellers |
| 5,825,352 A | 10/1998 | Bisset et al. |
| 5,864,334 A | 1/1999 | Sellers |
| 5,943,052 A | 8/1999 | Allen et al. |
| 6,216,988 B1 | 4/2001 | Hsu et al. |
| 6,266,050 B1 | 7/2001 | Oh et al. |
| 6,336,614 B1 | 1/2002 | Kwitek |
| 6,337,678 B1 | 1/2002 | Fish |
| 6,610,936 B2 | 8/2003 | Gillespie et al. |
| 6,611,253 B1 | 8/2003 | Cohen |
| 6,654,001 B1 | 11/2003 | Su |
| 6,756,971 B1 | 6/2004 | Ramey et al. |
| 6,819,312 B2 | 11/2004 | Fish |
| 6,943,705 B1 | 9/2005 | Bolender et al. |
| 7,038,659 B2 | 5/2006 | Rajkowski |
| 8,098,233 B2 | 1/2012 | Hotelling et al. |
| 2002/0080123 A1 | 6/2002 | Kennedy et al. |
| 2004/0104894 A1 | 6/2004 | Tsukada et al. |
| 2004/0233624 A1 | 11/2004 | Aisenberg |
| 2006/0033701 A1 | 2/2006 | Wilson |
| 2006/0119582 A1 | 6/2006 | Ng et al. |
| 2007/0273660 A1 | 11/2007 | XiaoPing |
| 2008/0018615 A1 | 1/2008 | Zadesky et al. |
| 2010/0214250 A1 | 8/2010 | Gillespie et al. |

FOREIGN PATENT DOCUMENTS

| | | |
|---|---|---|
| JP | 6289969 A | 10/1994 |
| JP | 11194883 A | 7/1999 |
| WO | 92/11623 | 7/1992 |
| WO | 98/43202 A1 | 10/1998 |
| WO | 2004025449 A2 | 3/2004 |

*Primary Examiner* — Ricardo L Osorio

(74) *Attorney, Agent, or Firm* — Brake Hughes Bellermann LLP

(57) ABSTRACT

In one general aspect, a computing device can include a display, a touchpad configured for moving a cursor on the display, and a keyboard for inputting input into the computing device. The computing device also can include a scratch region mutually exclusive from the touchpad and the keyboard. The scratch region can be configured to receive input to the computing device based on contact with the scratch region. An interaction detection module can be configured to detect an interaction with the scratch region, and configured to generate an indicator of the interaction. The computing device can also include a scratch region analyzer configured to define an alphanumeric character based on the indicator of the interaction with the scratch region.

21 Claims, 8 Drawing Sheets

US 8,624,837 B1

METHODS AND APPARATUS RELATED TO A SCRATCH PAD REGION OF A COMPUTING DEVICE

TECHNICAL FIELD

This description relates to user input devices of a computing device.

BACKGROUND

Many known computing devices can have several mechanisms through which a user may interact with (e.g., trigger) one or more functions of the computing device. For example, user input devices such as keyboards, mouse devices, touch screen displays and/or so forth, through which a user may interact with computing devices to perform one or more computing functions can be connected with and/or integrated into the computing devices. However, these user input devices may be cumbersome to use and/or may not produce results at a desirable speed and/or level of accuracy.

SUMMARY

In one general aspect, a computing device can include a display, a touchpad configured for moving a cursor on the display, and a keyboard for inputting input into the computing device. The computing device also can include a scratch region mutually exclusive from the touchpad and the keyboard. The scratch region can be configured to receive input to the computing device based on contact with the scratch region. An interaction detection module can be configured to detect an interaction with the scratch region, and configured to generate an indicator of the interaction. The computing device can also include a scratch region analyzer configured to define an alphanumeric character based on the indicator of the interaction with the scratch region.

In another general aspect, a tangible computer-readable storage medium can store code representing instructions that when executed can be configured to cause a processor to perform a process. The code can include code to detect a plurality of interactions with a scratch region of a computing device. The scratch region can be mutually exclusive from a touchpad for moving a cursor of the computing device and from a keyboard of the computing device. The code can include code to generate an indicator of a first interaction from the plurality of interactions, and an indicator of a second interaction from the plurality of interactions. The code can include code to associate the indicator of the first interaction from the plurality of interactions with an interpretation instruction, and code to interpret, in response to the interpretation instruction, the second interaction from the plurality of interactions as an alphanumeric character based on the indicator of the second interaction from the plurality of interactions In yet another general aspect, a method can include changing at least a portion of a scratch device included in a computing device from an inactive state to an active state in response to a first interaction with a scratch region of the scratch device. The changing can be performed while a primary operating system of the computing device is in an inactive state. The method can include defining an indicator of the first interaction, and defining an indicator of a second interaction with the scratch region of the scratch device. The method can include associating the indicator of the first interaction from the plurality of interactions with an instruction configured to trigger processing of the indicator of the second interaction from the plurality of interactions.

The details of one or more implementations are set forth in the accompanying drawings and the description below. Other features will be apparent from the description and drawings, and from the claims.

DETAILED DESCRIPTION

Figure 1:
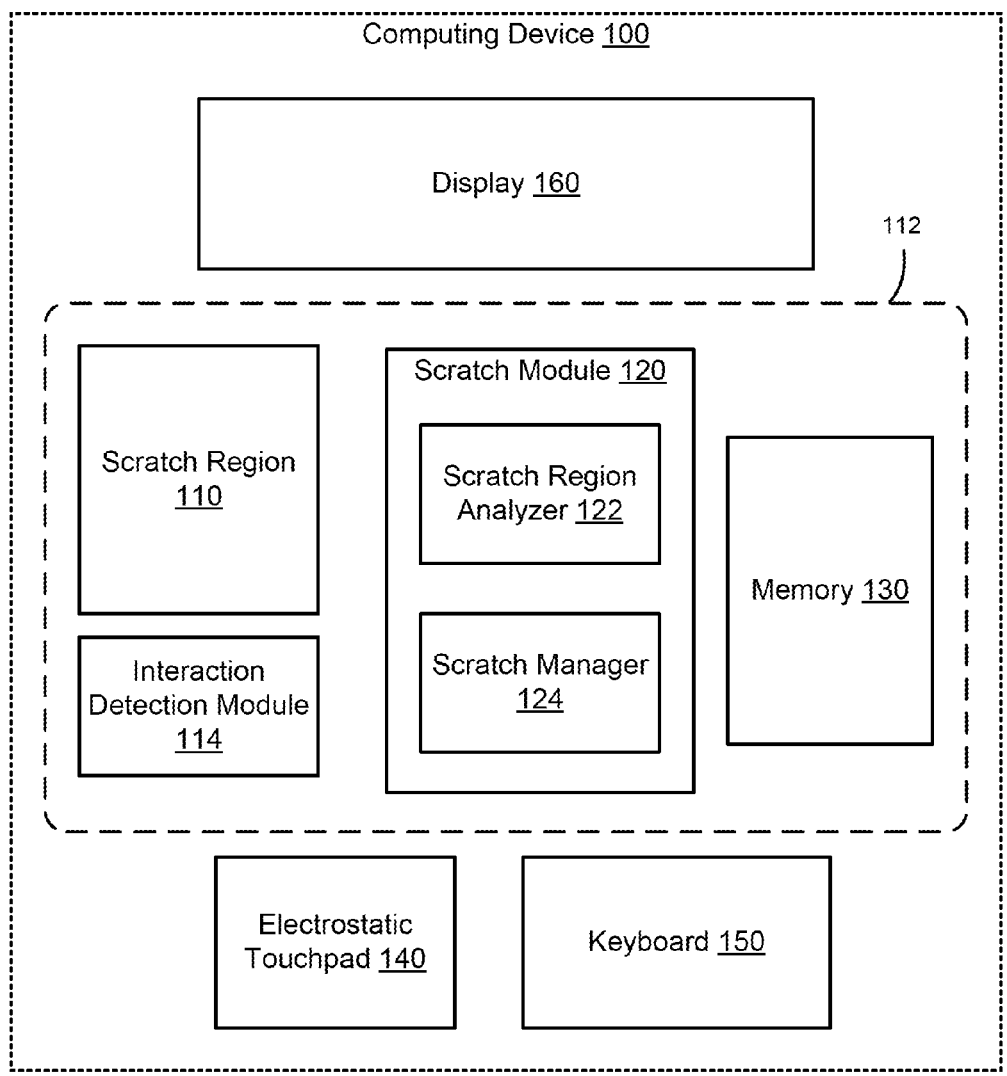
FIG. 1 is a block diagram of a computing device including a scratch region.

FIG. 1 is a block diagram of a computing device 100 including a scratch device 112 (also can be referred to as scratch pad device). The scratch device 112 is a user input device that is separate from other user input devices of the computing device 100 such as an electrostatic touch pad 140 of the computing device 100 used to control, for example, a mouse (e.g., a mouse pointing device) and/or a keyboard 150 of the computing device 100. Specifically, the scratch device 112 is a device of the computing device 100 through which a user can store information (e.g., notes) without interacting with the computing device 300 via the electrostatic touchpad 140 and/or the keyboard 150. Thus, the scratch device 112 is configured as an alternative through which a user can store information (in a memory of the computing device 100) using the computing device 100.

Specifically, the scratch device 112 is configured to function as an electronic notepad through which a user of the computing device 100 can take notes and/or make other types of markings. The scratch device 112 includes a scratch region 110 (also can be referred to as scratch pad region) upon which a user can write handwritten notes, drawings, etc. using, for example, a typical pencil similar to a typical paper notepad (e.g., a sticky notepad, a scratch pad). Unlike a typical paper notepad, notes jotted onto the scratch region 110 by the user can be electronically stored, manipulated, interpreted, and/or otherwise processed. Thus, a user can jot several pages of notations into the scratch region 110 that can be electronically stored as pages, recalled, printed, etc. Using the scratch device 112, a user can be spared the inconveniences of, for example, finding scratch paper, handling handwritten notes that may be misplaced, and so forth.

The scratch region 110 of the scratch device 112 can be configured so that an interaction (e.g., contact, gesture) of a user (not shown) with the scratch region 110 can be detected by an interaction detection module 114 of the scratch device 112. The interaction detection module 114 can be configured to generate an indicator of the interaction of the user with the scratch region 110. The indicator of the interaction can be, for example, an electrical signal (e.g., an analog signal) produced directly in response to the interaction with the scratch region 110. The indicator of the interaction (e.g., contact, gesture) can be sent from the interaction detection module 114 and processed at a scratch module 120. An interpretation of the interaction, such as a series of alphanumeric characters, can be defined (e.g., defined at the scratch module 120) based on the indicator of the interaction. For example, an indicator of an interaction can be interpreted as words or as an image drawn by a user. In some embodiments, the indicator of the interaction and/or the interpretation of the indicator of the interaction can be stored in a memory 130. In some embodiments, an indicator of an interaction of a user with the scratch region 110 can be referred to as an interaction indicator. In some embodiments, an interpretation of an interaction indicator can be referred to as an interpretation.

In some embodiments, the scratch region 110 of the scratch device 112 can be physically defined within a surface of the computing device 110. In some embodiments, the scratch region 110 can be associated with a physical area within an existing surface of the computing device 110. Although some of the details related to physical implementations of the scratch region 110 are described in connection with FIG. 1, more details related to the physical implementations of the scratch region 110 are also described, for example, in connection with the remaining figures.

In some embodiments, the scratch region 110 and the interaction detection module 114 can collectively define a touch (e.g., contact) sensitive device (e.g., an electrostatic touchpad, a resistive touchscreen device, a surface acoustic wave (SAW) device, a capacitive touchscreen device, a pressure sensitive device, a surface capacitive device, a projected capacitive touch (PCT) device, and/or so forth) that is separate from the electrostatic touch pad 140 of the computing device 100 used to control a mouse (e.g., a mouse pointing device) and/or the keyboard 150 of the computing device 100. Said differently, the scratch region 110 and the interaction detection module 114 can collectively define an input device that is different from a device such as the electrostatic touchpad 140 and/or the keyboard 150.

The scratch region 110 and the interaction detection module 114 can be collectively defined so that an interaction (e.g., contact, gesture) of the user with the scratch region 110 can be converted into an indicator by the interaction detection module 114. The interaction with the scratch region 110 can be any type of interaction that can be detected by and converted by the interaction detection module 114 into an indicator. In some embodiments, the interaction detection module 114 can be any type of hardware and/or software that can be used to convert an interaction of the user with the scratch region 110 into an indicator of the interaction. In some embodiments, the defining of an indicator based on an interaction with the scratch region 110 can be referred to as registering the interaction.

For example, a user can interact with the scratch region 110 (which can be defined within a surface of the computing device 100) by moving (e.g., contacting) a tip of a pointing device (e.g., a pencil, a pen, a stylus) and/or a finger of the user along a surface of the scratch region 110 to define, for example, one or more marks (e.g., lines, curves), one or more glyphs, portions of a drawing, alphanumeric characters, or set of alphanumeric characters, (which can be defined by one or more glyphs), and/or so forth. During the movements, the tip of the pencil can physically contact at least a portion of the surface of the scratch region 110. The interaction, which in this case is the physical movements of the pencil along the surface of the scratch region 100, can be detected by the interaction detection module 114, and the interaction detection module 114 can be configured to generate an indicator that represents the interaction. Specifically, the indicator can represent the glyph(s), the portion(s) of the drawing, the alphanumeric characters, and/or so forth.

In some embodiments, the indicator can be, for example, a digital signal (e.g., a binary digital signal, a binary sequence of bits) and/or an analog signal that represents one or more portions of the interaction. In some embodiments, an indicator can be an approximation of an interaction. For example, an indicator can be configured to approximate one or more portions of the interaction using a sequence of bits that represent an approximated image of the portion(s) of the interaction. As a specific example, an indicator can be, or can include, three points that approximate a curved line formed during an interaction. The three points can be represented as, for example, a set of bit values.

In some embodiments, an interpretation of an indicator can be, for example, a digital signal (e.g., a binary digital signal, a binary sequence of bits) and/or an analog signal that represents one or more portions of the interpretation of the indicator. For example, a series of signals generated by, for example, an interaction detection module 114 can be indicators of an interaction with the scratch region 110. The series of signals can be interpreted and represented as alphanumeric characters (American Standard Code for Information Interchange (ASCII) characters), words (e.g., written in cursive), phrases, and/or so forth. The alphanumeric characters can be considered an interpretation of the indicators of the interaction.

An interaction indicator, which is generated by the interaction detection module 114, can be sent from the interaction detection module 114 to the scratch module 120. The scratch module 120 can have a scratch manager 124 configured to handle storage of the interaction indicator in the memory 130. In some embodiments, the interaction indicator, which can be a digital signal and/or an analog signal, can be stored directly in the memory 130 without additional processing at the scratch module 120.

As shown in FIG. 1, the scratch module 120 includes a scratch region analyzer 122 that can be configured to process an interaction indicator. The scratch region analyzer 122 can be configured to, for example, interpret an interaction indicator. The interpretation of the interaction indicator can be stored by the scratch manager 124 in the memory 130. Accordingly, the scratch manager 124 can be configured to handle storage of interaction indicators and/or interpretations of interaction indicators in the memory 130. In some embodiments, the interpretation of an interaction indicator can be stored as a digital signal (e.g., a binary sequence of bits) and/or as an analog signal.

For example, a user can interact with the scratch region 110 by drawing glyphs associated with an alphanumeric character (or set of alphanumeric characters) on the scratch region 110 of the computing device 100. The interaction detection module 114 can generate an indicator as a binary representation of the glyphs. The indicator, which is a binary representation of the glyphs, can be sent to the scratch region analyzer 122 of the scratch module 120. The scratch region analyzer 122 can be configured to interpret the binary representation of the glyphs as the alphanumeric character (or set of alphanumeric characters). Accordingly, the scratch region analyzer 122 can trigger the scratch manager 124 to store a binary representation (e.g., an American Standard Code for Information Interchange (ASCII) representation) of the alphanumeric character (or set of alphanumeric characters) and/or the binary representation of the glyphs in the memory.

In some embodiments, the scratch module 120 can be configured to prompt a user with respect to an interpretation of an interaction indicator. For example, the scratch region analyzer 122 can be configured to interpret an interaction indicator as an alphanumeric character (or set of alphanumeric characters), a drawing, and/or so forth, and the scratch module 120 can be configured to trigger a prompt requesting confirmation from a user as to whether the interpretation of the interaction indicator is correct. In some embodiments, the scratch module 120 can be configured to present several potential interpretations, one or more of which can be selected by a user.

In some embodiments, the scratch region analyzer 122 can be any type of hardware and/or software configured to interpret one or more interaction indicators generated by the interaction detection module 114. For example, the scratch region analyzer 122 can include an optical character recognition (OCR) module, a drawing recognition module, and/or so forth.

In some embodiments, the interaction detection module 114 can be configured to generate an interaction indicator based on only a particular type of interaction with the scratch region 110. For example, it may be desirable to generate an interaction indicator only based on a user interacting with the scratch region 100 with a pencil or other pointing device but not to generate an interaction indicator when the user rests his or her palm on the scratch region. To achieve this, the interaction detection module 114 can be configured to generate an interaction indicator only when the instantaneous interaction with the scratch region 110 is smaller than a particular size (e.g., smaller than a 6 square millimeter (mm) area, smaller than a palm of a hand), and/or larger than a particular size. In some embodiments, the interaction detection module 114 can be configured to generate an interaction indicator based on an interaction only if the interaction is performed using a finger of a user and/or a particular device such as a ballpoint pen, a graphite pencil, a stylus, and/or so forth. For example, a stylus may be embedded with an identifying device (e.g., active identifying device, passive identifying device) so that proximity of the stylus to the scratch region may be detected, and only when such proximity is detected may an interaction indicator be generated. In another example, the interaction detecting device 114 can be configured to generate an interaction indicator only when the interaction is defined by what appears to be a tip of a pointing device such as a pen, pencil or stylus, by generating an interaction indicator only when the instantaneous interaction with the scratch region 110 is greater than a predefined minimum area (e.g., 1 $mm^2$) and less than a predefined maximum area (e.g., 6 $mm^2$). In some embodiments, the interaction detection module 114 can be configured to generate an interaction indicator based on an interaction by, for example, a finger of the user.

In some embodiments, an interaction with the scratch region 110 can be associated with an instruction (e.g., can function as an instruction). In such embodiments, the interaction detection module 114 can generate an interaction indicator based on the interaction (e.g., contact, gesture), and the interaction indicator can be interpreted by the scratch region analyzer 122 of the scratch module 120 as an instruction (or can be used to fetch an instruction) to perform a particular action (e.g., deleting of a previously stored interaction indicator (i.e., a delete instruction), editing of a previous interaction indicator, interpretation of a subsequent interaction indicator (i.e., an interpretation instruction), etc.). For example, drawing a slash across the entire scratch region 110 can be interpreted as an instruction to save (i.e., a save instruction) a set of interaction indicators (since a previous instruction was given) with the scratch region 110 as a current note. As another example, double-tapping in the scratch region 110 can be interpreted as an instruction to delete (i.e., a delete instruction) temporarily buffered interaction indicators that have not been set aside for longer term storage.

In some embodiments, for example, interpretation of an interaction indicator from the interaction detection module 114 can be triggered by an additional interaction with the scratch region 110. In such embodiments, the scratch module 120 can be configured to trigger interpretation of the interaction indicator in response to a second interaction indicator generated based on the additional interaction. Specifically, the interaction detection module 114 can be configured to generate a first interaction indicator based on a first interaction of a user with the scratch region 110. The first interaction indicator can be sent to the scratch module 120, and, in some embodiments, the first interaction indicator can be stored in the memory 130. At a later time, the interaction detection module 114 can be configured to generate a second interaction indicator based on a second interaction of the user with the scratch region 110. The second interaction indicator can be sent to the scratch module 120. The scratch region analyzer 122 can be configured to determine that the second interaction indicator is (or is associated with) an instruction configured to trigger interpretation (i.e., an interpretation instruction) of the first interaction indicator.

As a specific example, an indicator of a first interaction from the interaction detection module 114 can be interpreted as an alphanumeric character by the scratch region analyzer 122 in response to an interpretation instruction. The interpretation instruction can be triggered by an indicator of a second interaction with the scratch region 110. The scratch region analyzer 122 can be configured to determine that the indicator of the second interaction is associated with the interpretation instruction.

In some embodiments, one or more instructions that can be used to trigger one more functions of the scratch module 120 (or a portion thereof) can be learned by the scratch module 120. Specifically, the scratch module 120 (or a portion thereof) can be trained to process one or more interactions with the scratch region 110 by a user as an instruction. For example, the scratch region analyzer 122 can be changed from an operational mode (e.g., an analyzing mode) to a learning mode. When in the learning mode, the scratch region analyzer 122 can be configured to associate a particular interaction with the scratch region 110 (where the particular interaction may be performed differently by different users) with an instruction that can trigger one or more functions of the scratch module 120. Then, when the scratch region analyzer 122 is in the operational mode, the specified interaction with the scratch region can be interpreted by the scratch region analyzer 122 as the instruction.

For example, a user can change the scratch region analyzer 122 from an operational mode to a learning mode (during a learning time period). While in the learning mode, the scratch region analyzer 122 can be triggered (e.g., triggered by the user) to associate a specified interaction(s) (and/or interaction indicators of the specified interaction(s)) with the scratch region 110 with, for example, an instruction configured to trigger interpretation (i.e., an interpretation instruction) of the previous interaction indicator. The specified interaction can be referred to as a teaching interaction.

After triggering the association, the user can change the scratch region analyzer 122 from the learning mode back to the operational mode (during an operational time period). While in the operational mode, the interaction detection module 114 can be configured to generate an interaction indicator based on an interaction of the user with the scratch region 110. The interaction during the operational mode can be referred to as an operational interaction. The interaction indicator can be sent to the scratch module 120. The scratch region analyzer 122 can be configured to determine that the interaction indicator of the operational interaction is associated with the instruction based on the association performed while the scratch region analyzer 122 was in the learning mode. Specifically, the scratch region analyzer 122 can be configured to associate the interaction indicator of the operational interaction with the instruction based on, for example, a match (through a comparison) of the interaction indicator of the operational interaction with an interaction indicator of the teaching interaction.

As a specific example, a user can change the scratch region analyzer 122 from an operational mode to a learning mode (during a learning time period). While in the learning mode, an oval drawn by a user in the scratch region 110 can be associated by the scratch region analyzer 122 with a save instruction. The save instruction can cause (or can be used to cause) saving of a previous set of interaction indicators as a drawing. After triggering the association, the user can change the scratch region analyzer 122 from the learning mode back to the operational mode (during an operational time period). While in the operational mode, the interaction detection module 114 can be configured to generate a set of interaction indicators based on the user drawing a picture on the scratch region 110. After drawing the picture, the user can draw the oval (which was learned while the scratch region analyzer 122 was in the learning mode) in the scratch region 110. The scratch region analyzer 122 can be configured to determine that the oval is associated with the save instruction. In response to the save instruction, the set of interaction indicators associated with the picture and generated prior to the drawing of the oval can be saved as a drawing.

In some embodiments, for example, storage of a first interaction indicator can be triggered by a second interaction indicator interpreted, by the scratch region analyzer 122 of the scratch module 120, as an instruction to store the first interaction indicator. In some embodiments, one or more interaction indicators can be modified, deleted, and/or otherwise processed in response to another interaction indicator associated with an interaction with the scratch region 110. For example, an interaction indicator (or group of interaction indicators) can be deleted from the memory 130 in response to the scratch region analyzer 122 determining that a user drew a large "X" across the entire scratch region 110 directly after the interaction indicator (or group of interaction indicators) have been stored in the memory 130.

Figure 2:
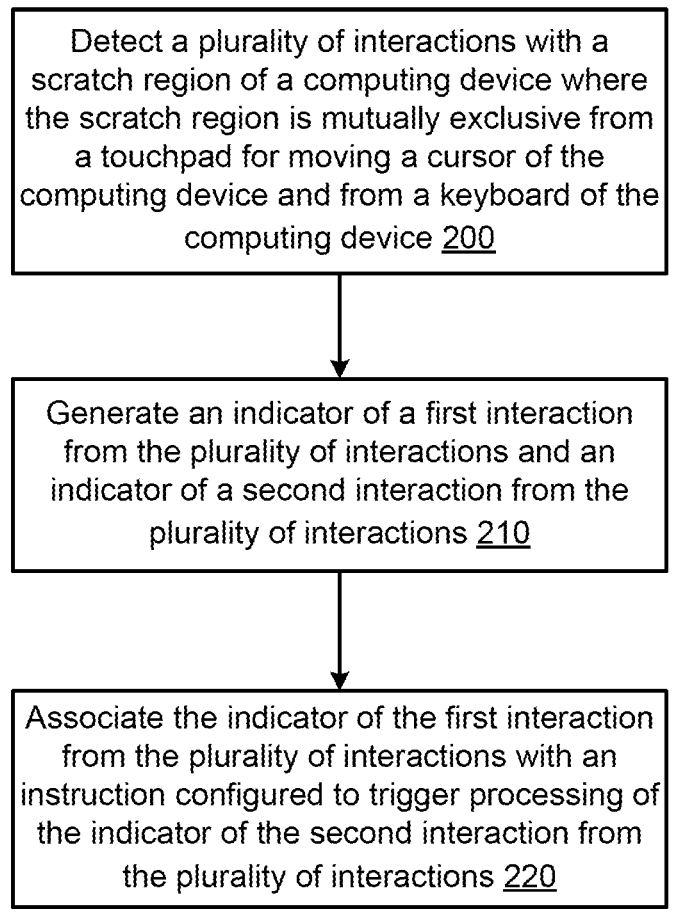
FIG. 2 is a flowchart that illustrates a method for associating an interaction with an instruction.

FIG. 2 is a flowchart that illustrates a method for associating an interaction with an instruction. At least some portions of the method shown in FIG. 2 can be performed by a scratch device such as scratch device 112 shown in FIG. 1.

As shown in FIG. 2, a plurality of interactions with a scratch region of a computing device, which is mutually exclusive from a touchpad for moving a cursor of the computing device and from a keyboard of the computing device, are detected (block 200). The interactions can be, for example, interactions of a pencil (controlled by a user) with the scratch region of the computing device. In some embodiments, the scratch region can be included on an outside surface of the computing device. In some embodiments, the scratch region can be mutually exclusive from a keyboard and an electrostatic touchpad for controlling a pointing device of the computing device.

An indicator of a first interaction from the plurality of interactions and an indicator of a second interaction from the plurality of interactions are generated (block 210). The indicator of the first interaction and the indicator of the second interaction can be generated by, for example, an interaction detection module such as interaction detection module 114 shown in FIG. 1. In some embodiments, the indicators can be, for example, electrical signals.

The indicator of the first interaction from the plurality of interactions is associated with an instruction configured to trigger processing of the indicator of the second interaction from the plurality of interactions (block 220). In some embodiments, the indicator of the first interaction can be associated (e.g., associated by a scratch region analyzer such as scratch region analyzer 122 shown in FIG. 1) with the instruction based on a comparison of the indicator of the first interaction with a predefined interaction indicator associated with the instruction.

For example, the scratch region analyzer 122 can be changed from an operational mode (e.g., an analyzing mode) to a learning mode. When in the learning mode, the scratch region analyzer 122 can be configured to associate a particular interaction (such as drawing a slash) with the scratch region 110 with an instruction that can trigger one or more functions of the scratch module 120. Then, when the scratch region analyzer 122 is in the operational mode, the specified interaction (which can be stored and represented as a predefined interaction indicator) with the scratch region can be interpreted by the scratch region analyzer 122 as the instruction. As a specific example, drawing a slash across the entire scratch region 110 (i.e., a first interaction) can be interpreted as an instruction (by comparison with a predefined interaction indicator associated with the instruction) to store a different indicator of an interaction (i.e., a second interaction) as an alphanumeric character.

Referring back to FIG. 1, in some embodiments, one or more functions performed by the scratch module 120 (such as interpretation performed by the scratch region analyzer 122 and/or storage of an interaction indicator by the scratch manager 124) can be triggered by a button (not shown). More details related to one or more buttons used to trigger an action performed by the scratch module 120 are described in connection with the figures below.

In some embodiments, one or more functions of the scratch module (such as an interpretation performed by the scratch region analyzer 122) can be triggered via the electrostatic touch pad 140 and/or the keyboard 150. For example an interpretation of an interaction indicator can be triggered via the keyboard 150 by a user pressing a combination of keys of the keyboard 150.

In some embodiments, the scratch manager 124 can be configured to process one or more interaction indicators. For example, the scratch manager 124 can be configured to store one or more interaction indicators (which can be generated in response to one or more interactions with the scratch region 110) and/or one or more interpretations of the interaction indicator(s) in the memory 130 based on a date/timestamp. In some embodiments, the scratch manager 124 can be configured to trigger storage of one or more interpretations of one or more interaction indicators based on the subject matter of the interpretation(s) of the interaction indicator(s). For example the scratch manager 124 can be configured to store a group of interaction indicators associated with a particular subject matter as a particular file (or set of files) in the memory 130.

In some embodiments, an interaction with the scratch region 110 can be shown on a display 160 of computing device 100. For example, the display 160 can be configured to display an interaction of a user with the scratch region 122 as the user is performing the interaction. Thus, interactions with the scratch region 122 can be displayed at the display 160 simultaneous with the interactions as they are occurring. Accordingly, a user can see on the display 160 the interactions the user is defining in the scratch region 110. In such embodiments, the interaction detection module 114 can be configured to send an indicator of an interaction to the display 160 as well as to the scratch module 120. In some embodiments, the indicator of the interaction can be interpreted by the scratch region analyzer 122 of the scratch module 120 and the interpretation can be sent to the display 160 for representation on the display 160.

In some embodiments, a portion of the display 160 can be dedicated, either permanently or temporarily, to display of interactions (e.g., display of representations of the interactions) with the scratch region 110. In some embodiments, a portion of the display 160 can be temporarily dedicated to display of interactions with the scratch region 110. In some embodiments, the entire display 160 (or a portion thereof) can be temporarily dedicated to display of interactions with the scratch region 110 when the scratch region 110 (and associated hardware and/or software) have been activated (e.g., activated in response to an interaction with the scratch region 110). In some embodiments, the scratch region 110 and associated hardware and/or software can be referred to as a scratch device 112 (shown in FIG. 1). Although not shown, in some embodiments, a scratch region (such as scratch region 110) can be included in a display (such as display 160).

Although not shown in FIG. 1, a separate display (such as a liquid crystal display (LCD)) can be configured to display one or more interactions of a user with the scratch region 122. In such embodiments, this separate display can be dedicated to display of interactions with the scratch region 110. In such embodiments, a separate display dedicated to display of interactions with the scratch region 110 can be installed near the scratch region 110. Although not depicted in FIG. 1, in some embodiments, the separate display can be disposed behind the scratch region 110, which can be at least partially transparent, so that images (or portions thereof) that track (e.g., precisely track) interactions with the scratch region 110 can be displayed on the separate display simultaneous (or substantially simultaneous) with (or during at least a portion of the time period during which) the interactions with the scratch region 110 as they are occurring. Accordingly, interactions with the scratch region 110 can appear to a user performing the interactions that the interactions with the scratch region 110 are being created on (e.g., written onto) the separate display.

An interaction indicator (e.g., a raw interaction indicator) and or an interpretation of an interaction indicators stored in the memory 130 can be retrieved from the memory 130. In some embodiments, the scratch manager 124 can be configured to retrieve an interaction indicator and/or an interpretation of the interaction indicator from the memory in response to an instruction. The instruction can be triggered via the electrostatic touch pad 140, the keyboard 150, and/or the scratch region 110.

Memory 130 can be any type of memory device such as a random-access memory (RAM) component or a disk drive memory. As shown in FIG. 1, the memory 130 is a local memory included in the computing device 100. Although not shown, in some embodiments, the memory 130 can be implemented as more than one memory component (e.g., more than one RAM component or disk drive memory) within the computing device 100. In some embodiments, the memory 130 can be, or can include, a non-local memory (e.g., a memory not physically included within the computing device 100) within a network (not shown). For example, the memory 130 can be, or can include, a memory shared by multiple computing devices (not shown) within a network. In some embodiments, the memory 130 can be associated with a server device (not shown) on a client side of a network and configured to serve several computing devices on the client side of the network.

The components of the computing device 100 (e.g., the scratch module 120) are configured to operate within an environment that includes an operating system. In some embodiments, the operating system can be configured to facilitate, for example, the interpretation of an interaction with the scratch region 100.

The computing device 100 can be, for example, a wired device and/or a wireless device (e.g., wi-fi enabled device) and can be, for example, a computing entity (e.g., a personal computing device), a server device (e.g., a web server), a mobile phone, a personal digital assistant (PDA), e-reader, and/or so forth. The computing device 100 can be configured to operate based on one or more platforms (e.g., one or more similar or different platforms) that can include one or more types of hardware, software, firmware, operating systems, runtime libraries, and/or so forth.

In some embodiments, the computing device 100 can represent a cluster of devices. In such an embodiment, the functionality and processing of the computing device 100 (e.g., the scratch module 120 of the computing device 100) can be distributed to several computing devices of the cluster of computing devices.

In some embodiments, one or more portions of the components shown in the computing device 100 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some embodiments, one or more portions of the scratch module 120 can be, or can include, a software module configured for execution by at least one processor (not shown). In some embodiments, the functionality of the components can be included in different modules and/or components than those shown in FIG. 1. For example, although not shown, the functionality of the scratch module 120 can be included in a different module than the scratch module 120, or divided into several different modules.

In some embodiments, the computing device 100 can be included in a network. In some embodiments, the network can include multiple computing devices (such as computing device 100) and/or multiple server devices (not shown). Also, although not shown in FIG. 1, the computing device 100 can be configured to function within various types of network environments. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can be have portions based on various protocols such as Internet Protocol (IP) and/or a proprietary protocol. The network can include at least a portion of the Internet.

Figure 3:
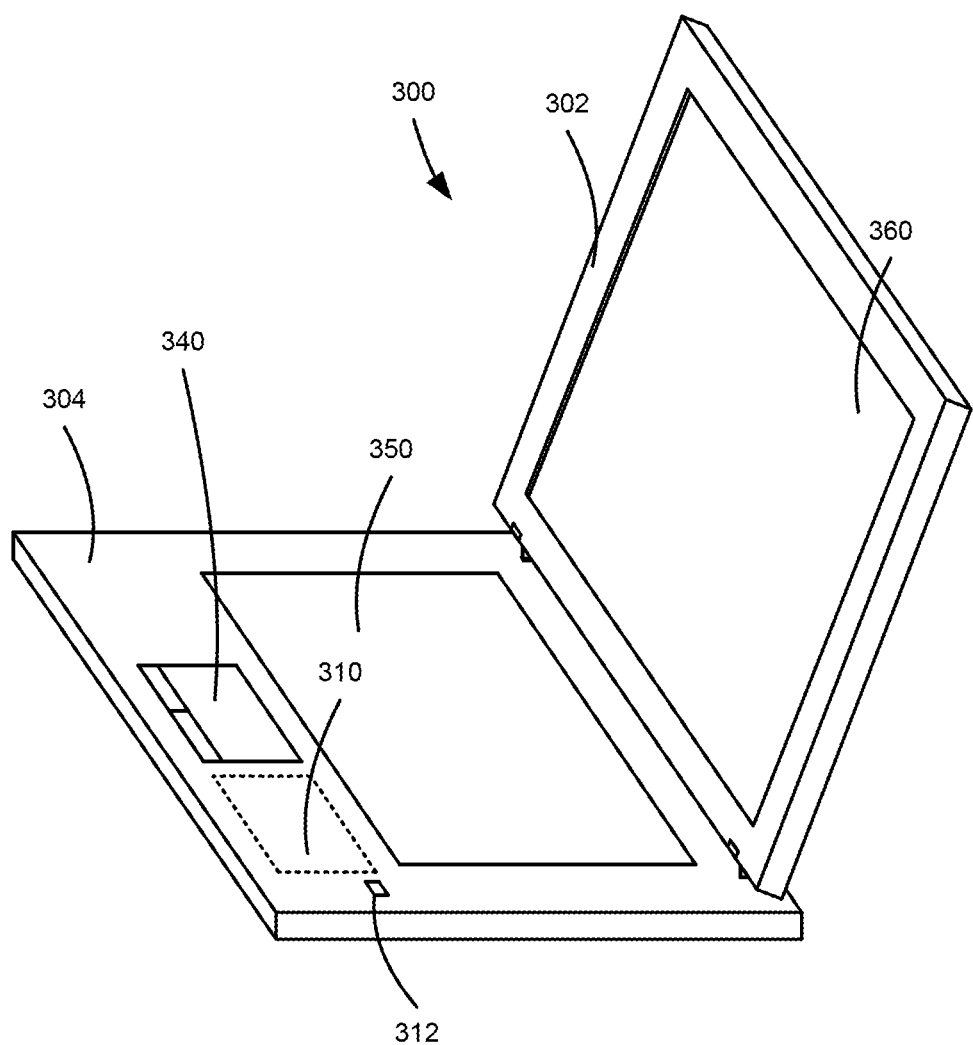
FIG. 3 is a diagram that illustrates a computing device that has a scratch region.

FIG. 3 is a diagram that illustrates a computing device 300 that has a scratch region 310. As shown in FIG. 3, the scratch region 310 is adjacent to an electrostatic touchpad 340 configured to control a pointing device such as a mouse. The computing device 300 has a display portion 302 and a base portion 304. The electrostatic touchpad 340 and the scratch region 310 are included in the base portion 304. The base portion 304 also includes a keyboard 350. The display portion 302 of the computing device 300 includes a display 360 that can be, for example, a liquid crystal display (LCD), or other type of display device. The computing device 300 shown in FIG. 3 is in an open configuration. When the computing device 300 is in a closed configuration (not shown), the keyboard 350 can be disposed between the display portion 302 and the base portion 304 (which can be substantially parallel to one another).

The scratch region 310 is a portion of the base portion 304 of the computing device 300 through which a user of the computing device 300 can store information without interacting with the computing device 300 via the electrostatic touchpad 340 and/or the keyboard 350. Thus, the scratch region 310 is configured as an alternative through which a user can store information (in a memory of the computing device 300) using the computing device 300.

The scratch region 310 is configured so that a user of the computing device 300 can interact with the scratch region 310, for example, using a writing utensil (not shown), a stylus (not shown), a finger, and/or so forth. In other words, the scratch region 310 is configured so that a user of the computing device 300 can interact with the scratch region 310 by contacting the scratch region 310 with, for example, using a writing utensil (not shown), a stylus (not shown), a finger, and/or so forth. The interaction with the scratch region 310 can be detected and indicators of the interaction can be interpreted and/or stored in a memory (not shown) for later recall. For example, a user, using a writing utensil such as a pen, can interact with the scratch region 110 by handwriting a note in the scratch region 310. The handwritten note (which is the interaction) can be detected (e.g., detected by an interaction detection module such as interaction detection module 114 shown in FIG. 1) and converted into an interaction indicator that can be stored in the memory of the computing device 300. In some embodiments, the interaction indicator can be interpreted by a scratch region analyzer of a scratch module (e.g., the scratch region analyzer 122 of the scratch module 120 shown in FIG. 1), and the interpretation of the interaction indicator can be stored in the memory of the computing device 300.

In this embodiment, the base portion 304 the computing device 300 includes a button 312. At least a portion of the scratch region 310 (and at least a portion of the associated hardware and/or software such as an interaction detection module and/or scratch module) is activated when the button 312 is actuated. Specifically, the scratch region 310 (and associated hardware and/or software) can be configured to remain in an inactive state (e.g., off state) so that interactions of a user with the scratch region 310 will not be registered until the button 312 has been activated. After the button 312 has been activated the scratch region 310 (and associated hardware and/or software) can be configured to change from the inactive state to an active state (e.g., an on state) where interactions of a user with the scratch region 310 can be registered. In some embodiments, a general reference to a scratch region, such as scratch region 310, can include reference to hardware and/or software (e.g., interaction detection module, scratch module) associated with the scratch region. In some embodiments, the scratch region 310 and associated hardware and/or software (not shown in FIG. 3) can collectively be referred to as a scratch device.

In some embodiments, the scratch region 310 (and associated hardware and/or software) can be configured to change from an active state to an inactive state (or a sleep state) if an interaction with the scratch region 310 has not occurred within a specified period of time after the button 312 has been activated. In some embodiments, the scratch region 310 (and associated hardware and/or software) can be configured to remain in a sleep state until a user interacts with the scratch region 310.

In some embodiments, the computing device 300 can be configured so that one or more portions of the computing device 300 can remain in an inactive state (e.g., an off state, a sleep state) when the scratch region 310 is in an active state (e.g., an on state). For example, the display 360 of the computing device 300 can be inactive (e.g., in an off state, in a non-illuminating state (e.g., a relatively low illuminating state)) even though the scratch region 310 is in an active state. In some embodiments, an operating platform of (e.g., a primary operating platform, an operating system and associated hardware/software) associated with the computing device 300 can remain in an inactive state (e.g., off state, sleep state) while at least a portion of the scratch region 310 and at least a portion of associated hardware (e.g., memory, processor) and/or software is active (i.e., scratch device). In such embodiments, the scratch region 310 can be associated with hardware and/or software that is sufficiently independent from the operating platform associated with the computing device 300 so that the scratch region 310 can be in an active state while the computing device 300 is in (e.g., remains in) an inactive state.

In some embodiments, the scratch region 310 can be associated with a buffer and/or processor where information associated with the scratch region 310 can be temporarily stored and/or processed while one or more portions of the computing device 300 are in an inactive state. When the one or more portions of the computing device 300 is changed to (e.g., returned to) an active state, the information that is temporarily stored and/or processed can then be stored in and/or processed at the computing device 300.

In some embodiments, the button 312 can be configured to trigger pagination of the scratch region 310. For example, indicators of a set of interactions (or interpretations of the indicators of set of interactions) with the scratch region 310 can be stored in response to the button 312 been activated. Specifically, a user can interact with the scratch region 310 for a period of time (the period of time can be initiated by actuation of the button 312), and can activate the button 312 at the end of the period of time. The indicators of the interactions with the scratch region 310 during the period of time can be stored and/or interpreted as being related in response to the button 312 been activated at the end of the period of time. Thus, the indicators of the interactions can be associated with a particular page, and can be stored in a memory of the computing device 300 as the particular page in response to the button 312 been activated at the end of the period of time. In some embodiments, the pages can be referred to as note pages (e.g., or as sticky note pages).

In some embodiments, pagination can be triggered by an instruction (i.e., a pagination instruction) that has been associated with an interaction (e.g., an indicator of the interaction). For example, a first interaction (i.e., an indicator of the first interaction) of a user with the scratch region 310 can be interpreted as an instruction to start (i.e., a page start instruction) a note page, and a second interaction (i.e., an indicator of the second interaction) of a user with the scratch region 310 can be interpreted as an instruction to end (i.e., a page end instruction) the note page. Indicators of interactions with the scratch region 310 generated between the page start instruction and the page end instruction can be stored as the note page. In some embodiments, the page start instruction and the page end instruction can be types of pagination instructions.

In some embodiments, the computing device 300 can include a combination of hardware and/or software (i.e., a note page organization application, a computer desktop application) that can be used to manage note pages defined via the scratch region 310. For example, note pages can be organized (e.g., automatically organized) based on, for example, date/time stamps (e.g., creation date/time stamps, modification date/time stamps) associated with note pages, subject matter of the note pages, and/or so forth. In some embodiments, the organization can include storing the note pages in files and/or folders. For example, note pages created (or stored) during a specified time period (e.g., during a day or hour) can be stored in a folder associated with the specified time period. In some embodiments, the subject matter of a note page can be determined based on language processing of words associated with the note page. In such embodiments, note pages associated with the subject matter category can be stored in a folder associated with the subject matter category.

In some embodiments, organization of note pages can be triggered by an instruction associated with an interaction (e.g., an indicator of the interaction) and/or via the button 312. For example, an interaction (i.e., an indicator of the first interaction) of a user with the scratch region 310 can be interpreted as an instruction to store a note page in a specified folder. In some embodiments, actuation of the button 312 can trigger store of a note page in a specified folder.

In some embodiments, the button 312 can be configured to trigger interpretation of one or more indicators of interactions with the scratch region 310. For example, indicator of a set of interactions with the scratch region 310 can be interpreted in response to the button 312 having been activated. Specifically, a user can interact with the scratch region 310 for a period of time, and can activate the button 312 at the end of the period of time. The indicators of the interactions with the scratch region 310 during the period of time can be interpreted in response to the button 312 been activated at the end of the period of time.

In some embodiments, the button 312 can be configured to trigger display of one or more interactions (e.g., representations of the interaction(s)) with the scratch region 310. In some embodiments, one or more interactions with the scratch region 310 may be excluded from display on the display 360 in response to actuation of the button 312.

In some embodiments, one or more indicators of interactions with the scratch region 310 can be removed (e.g., deleted, cleared) in response to actuation of the button 312. The above-identified functions are presented by way of example only, and additional functions, in addition to those described, can be triggered by activation of the button 312.

Although not shown in FIG. 3, more than one button can be included in the computing device 300. Each of the buttons can be configured to trigger one or more functions associated with scratch region 310. For example, a first button can be configured to turn the functionality of scratch region 310 (and associated hardware and/or software) on and/or off, and a second button can be configured to trigger interpretation of an indicator of an interaction with the scratch region 310.

In some embodiments, the scratch region 310 can be configured so that a user can write in the scratch region 310 with a writing utensil (such as a pen), and marks made in the scratch region 310 by the writing utensil can be removed in a desirable fashion. In such embodiments, the scratch region 310 can be a wipeable writing surface. In some embodiments, the scratch region 310 can be made of, for example, a polymer-based surface that can be cleaned in a desirable fashion.

In some embodiments, the scratch region 300 and/or the button 312 can be included in different portions of the computing device 300. As shown in FIG. 3, the scratch region 310 and the button 312 are included to the right of the electrostatic pad 340 (if directly facing the display 360). In some embodiments, for example, the scratch region 310 and or the button 312 can be included in an area to the left of the electrostatic pad 340. In some embodiments, the button 312 may not be adjacent to the scratch region 310 as shown in FIG. 3. For example, the button 312 may be located in an area to the right of the electrostatic pad 340, and the scratch region 310 may be located in an area to the left of the electrostatic pad 340.

In some embodiments, the scratch region 310 can be included in a different computing device than the computing device 300 shown in FIG. 3. For example, the scratch region 310 can be included in a tablet type computing device. In some embodiments, the tablet type computing device may not have a separate base portion 304 and display portion 302. The functionality of at least a portion of the base portion 304 and at least a portion of the display portion 302 may be combined into a tablet type device. In some embodiments, the scratch region 310 can be included in a smaller computing device than the computing device 300 shown in FIG. 3. For example, the scratch region 310 can be included in a personal digital assistant (PDA) or an e-reader.

Although not shown, the functionality of the electrostatic pad 340 and the functionality of the scratch region 310 can be combined. In such embodiments, at least a portion of the scratch region 310 can overlap with the area of the electric static pad 340. In such embodiments, the button 312 can be used to trigger the functionality of the electrostatic pad 340 and/or the functionality of the scratch region 310. For example, actuation of the button 312 at a first time can trigger the functionality of the scratch region 310, and actuation of button 312 and a second time can trigger the functionality of the electrostatic pad 340. More details related to additional configurations of a scratch region are described in connection with the figures below.

Figure 4:
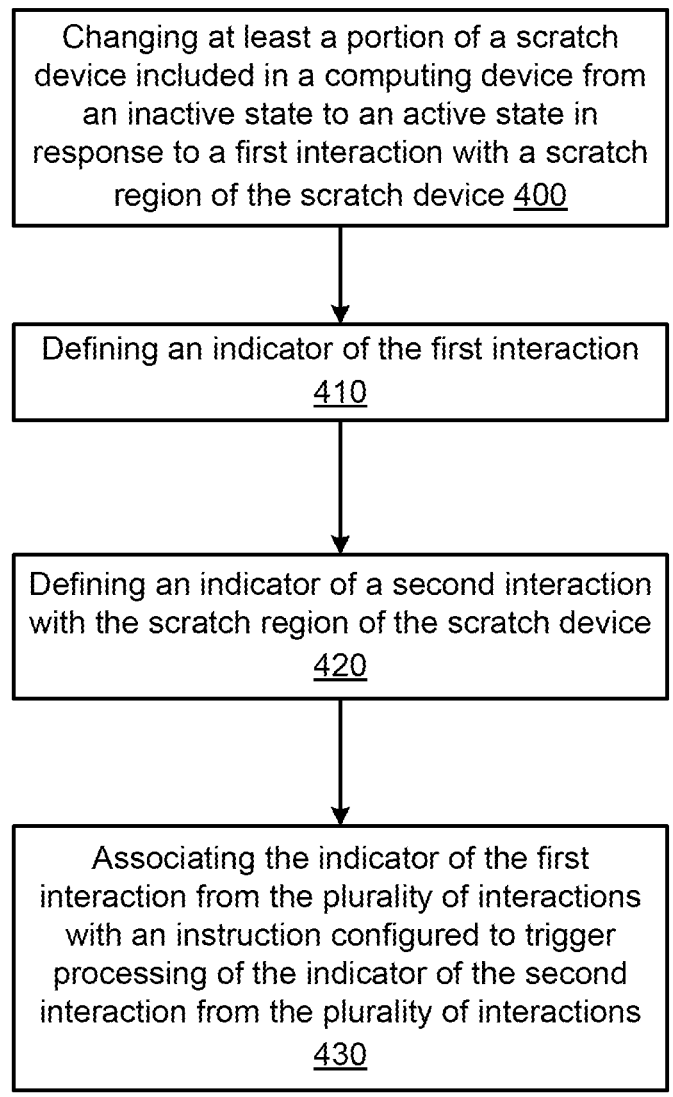
FIG. 4 is a flowchart that illustrates a method related to changing a state of a scratch device.

FIG. 4 is a flowchart that illustrates a method related to changing a state of a scratch device. The scratch device can be a scratch device such as scratch device 112 shown in FIG. 1.

As shown in FIG. 4, at least a portion of a scratch device included in a computing device is changed from an inactive state to an active state in response to a first interaction with a scratch region of the scratch device (block 400). The first interaction can be, for example, an interaction of a pen or finger of a user with the scratch region of the computing device.

An indicator of the first interaction is generated (block 410) and an indicator of a second interaction with the scratch region of the scratch device is also generated (block 420). The indicator of the first interaction and the indicator of the second interaction can be generated by, for example, an interaction detection module such as interaction detection module 114 shown in FIG. 1. In some embodiments, the indicators can be, for example, electrical signals.

The indicator of the first interaction from the plurality of interactions is associated with an instruction configured to trigger processing of the indicator of the second interaction from the plurality of interactions (block 430). In some embodiments, the indicator of the first interaction can be associated (e.g., associated by a scratch region analyzer such as scratch region analyzer 122 shown in FIG. 1) with the instruction based on a comparison of the indicator of the first interaction with a predefined interaction indicator associated with the instruction.

Figure 5:
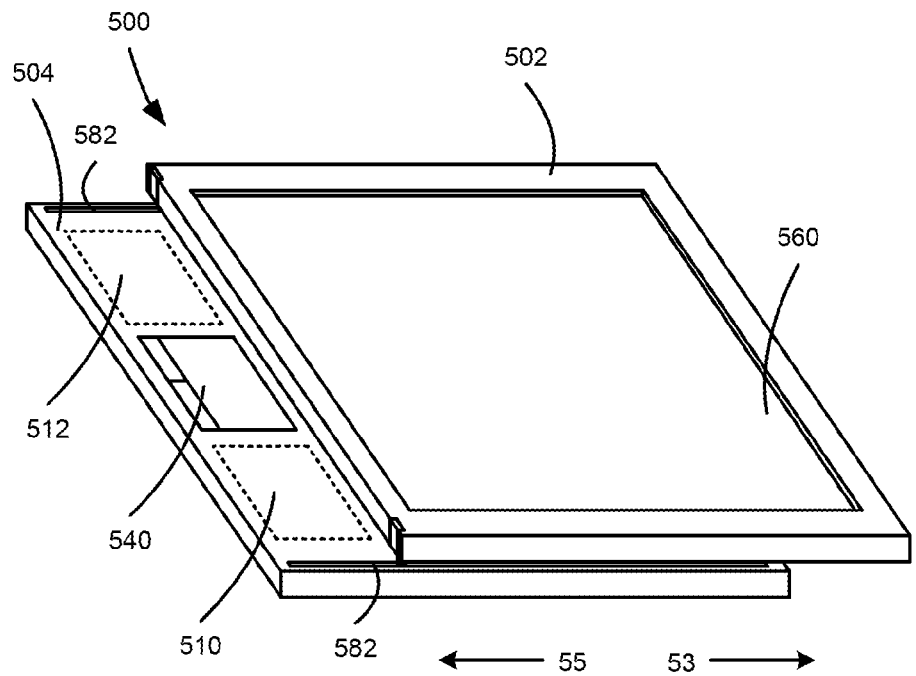
FIG. 5 is a schematic diagram that illustrates multiple scratch regions of a computing device.

FIG. 5 is a schematic diagram that illustrates multiple scratch regions of a computing device 500. As shown in FIG. 5, a first scratch region 510 and a second scratch region 512 are included in a base portion 504 of the computing device 500. Specifically, the first scratch region 510 is located on one side (right side) of electrostatic pad 540 and the second scratch region 512 is located on another side (left side) of the electrostatic pad 540. As shown in FIG. 5, the computing device 500 is a tablet type of computing device with a display 560 that is a touch sensitive display.

As shown in FIG. 5, a display 560 is included in the display portion 502 of the computing device 500. The first scratch region 510 and the second scratch region 512 are exposed so that the first scratch region 510 and/or the second scratch region 512 can be used by a user of the computing device 500 when the display portion 502 of the computing device 500 is slidably moved along sliding mechanisms 582 of the computing device 500. Specifically, the first scratch region 510 and the second scratch region 512 are exposed when the display portion 502 is moved along direction 53 so that the computing device 500 is in an open configuration. The computing device can be changed from the open configuration to a closed configuration (not shown) when the display portion 502 is moved along direction 55.

In some embodiments, the first scratch region 510 (and associated software and/or hardware) and/or the second scratch region 512 (and associated software and/or hardware) can be activated when the computing device 500 is changed from the closed configuration to the open configuration. In such embodiments, the first scratch region 510 (and associated software and/or hardware) and/or the second scratch region 512 (and associated software and/or hardware) can be in an inactive state when the computing device 500 is in the closed configuration. The first scratch region 510 (and associated software and/or hardware) and/or the second scratch region 512 (and associated software and/or hardware) can be in an active state when the computing device 500 is in the open configuration. In some embodiments, a scratch region 510 and associated software and/or hardware can collectively be referred to as a scratch device.

In some embodiments, the computing device 500 can be configured so that one or more portions of the computing device 500 can remain in an inactive state (or a sleep state) when the first scratch region 510 and/or the second scratch region 512 are in an active state (e.g., on state). In some embodiments, for example, the first scratch region 510 can be in an active state and the second scratch region 512 can be in an inactive state (or vice versa) while the remaining portions of the computing device computing device 500 can be in a sleep state.

In some embodiments, the first scratch region 510 can be associated with a different type of scratch region device than the second scratch region 512. For example the first scratch region 510 can be associated with (or define at least a portion of) a surface acoustic wave device, and the second scratch region 512 can be associated with (or define at least a portion of) a surface capacitive device.

Although not shown in FIG. 5, in some embodiments, the first scratch region 510 and/or the second scratch region 512 can be associated with one or more buttons. In such embodiments, the one or more buttons can be configured to trigger the functionality associated with the first scratch region 510 and/or the functionality associated with the second scratch region 512. The features described in connection with FIG. 5 may be combined any of the embodiments described herein.

Figure 6:
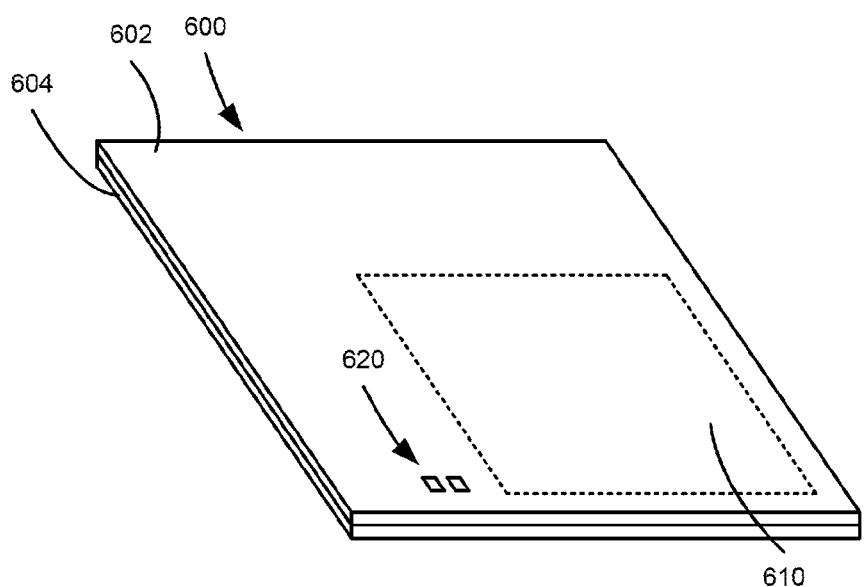
FIG. 6 is a diagram that illustrates a scratch region included in a portion of the computing device.

FIG. 6 is a diagram that illustrates a scratch region 610 included in a portion of the computing device 600. As shown in FIG. 6, the scratch region 610 is included on an outside surface of the computing device 600. Specifically, the scratch region 610 is included on an outside surface of a display portion 602 of the computing device. The computing device 600 also has a base portion 604. The computing device 600 shown in FIG. 6 is in a closed configuration so that a viewable portion of a display (not shown) of the display portion 602 is disposed between the base portion 604 the computing device and the display portion 602 of the computing device. In some embodiments, the computing device 600 can be configured to have an open configuration similar to the computing device 200 shown in FIG. 3 and/or similar to the computing device 500 shown in FIG. 5.

The scratch region 610 is configured so that the scratch region 610 can be used when the computing device 600 is in a closed configuration. Although the scratch region 610 is configured so that the scratch region 610 can be used when the computing device 600 is in a closed configuration, in some embodiments, the scratch region 610 can be configured so that the scratch region 610 can be used when the computing device 600 is in an open configuration.

Although not shown, in some embodiments, the scratch region 610 could be included on an outside surface of a base portion 604 of the computing device 600. In some embodiments, an additional scratch region (not shown), in addition to scratch region 610, can be included on the base portion 604 the computing device. In some embodiments, an additional scratch region (not shown), in addition to scratch region 610, can be included on the display portion 602 of the computing device 600.

As shown in FIG. 6, several buttons 620 are associated with the scratch region 610. In some embodiments, at least one of the buttons 620 can be configured to trigger the functionality associated with the scratch region 610. For example, in some embodiments, at least one of buttons 620 can be configured to activate the scratch region 610 so that an interaction of a user with the scratch region 610 can be registered.

Although not shown, in some embodiments, one or more buttons may not be associated with scratch region 610. In such embodiments, interactions with the scratch region 610 may be used to activate one more functions associated with scratch region 610. For example, a particular type of interaction with the scratch region 610 (e.g., a particular type of gesture) can be configured to activate the scratch region 610 so that an interaction with the scratch region 610 can be registered. Other types of interactions with the scratch region 610 can be configured to trigger other functionality of the scratch region 610.

In some embodiments, the computing device 600 can be configured so that the scratch region 610 may only be activated when the computing device 600 is in a particular orientation (as determined using, for example, a gyroscope or an accelerometer). For example, the scratch region 610 may only be activated when the scratch region 610 (and the computing device 600) is within a plane that is normal (e.g., substantially normal) to a gravitational pull of the earth. This orientation can be referred to as a flat orientation. The computing device 600 may be configured so the scratch region 610 is only activated when the computing device 600 is in the flat orientation so that interactions with the scratch region 610 may not be inadvertently registered by the scratch region 610 (and associated hardware and/or software which are not shown in FIG. 6) when not in the flat orientation. In some embodiments, the computing device 600 can be configured so that the scratch region 610 may only be activated when the computing device is in a different orientation than the flat orientation. In some embodiments, the scratch region 610 and associated hardware and/or software can collectively be referred to as a scratch device.

As another example, one or more indicators of interactions with the scratch region 610 can be ignored or discarded if the indicators of interactions with the scratch region 610 occur (e.g., occur during a time period) when an orientation of the computing device 600 does not satisfy an orientation condition. In contrast, one or more interactions with the scratch region 610 can be registered if the interactions with the scratch region 610 occur (e.g., occur during a time period) when an orientation of the computing device 600 satisfies an orientation condition. The orientation condition may be satisfied based on the computing device 600 being in a first orientation with respect to a plane (e.g., oriented so that the scratch region is substantially co-planar with the plane) and unsatisfied when the computing device 600 is in a second orientation with respect to the plane (e.g., oriented so that the scratch region is substantially normal to the plane).

In some embodiments, the scratch region 610 may be changed from an active state to an inactive state when the computing device 600 is changed from a closed configuration to an open configuration. In in some embodiments, the scratch region 610 may only be changed from an inactive state to an active state when the computing device 600 is in the closed configuration.

Although not shown, in some embodiments, a scratch region can be included on a backside of a tablet type computing device, or in a margin of a frontside of a tablet type computing device. Thus, the scratch region can be included on the side of the tablet type computing device that is opposite a display of the computing device.

In some embodiments, the scratch region 610 may be larger than that shown in FIG. 6 or smaller than the scratch region 610 shown in FIG. 6. In some embodiments, the scratch region 610 can have a different shape than that shown in FIG. 6. For example, the scratch region 610 can have a triangular shape, a hexagonal shape, a circular shape, and/or so forth. In some embodiments, the scratch region 602 can have an irregular shape.

In some embodiments, one or more boundaries of the scratch region 610 may be marked (e.g., visibly marked) so that the boundaries of the scratch region 610 can be identified by a user. In some embodiments, one or more boundaries of the scratch region 610 may not be visibly marked. In some embodiments, at least a portion of the scratch region 610 may be illuminated using, for example, a light (e.g., a backlight, a light emitting diode (LED)) so that the scratch region 610 may be identified by a user of the computing device 600. The features described in connection with FIG. 6 may be combined any of the embodiments described herein.

Figure 7:
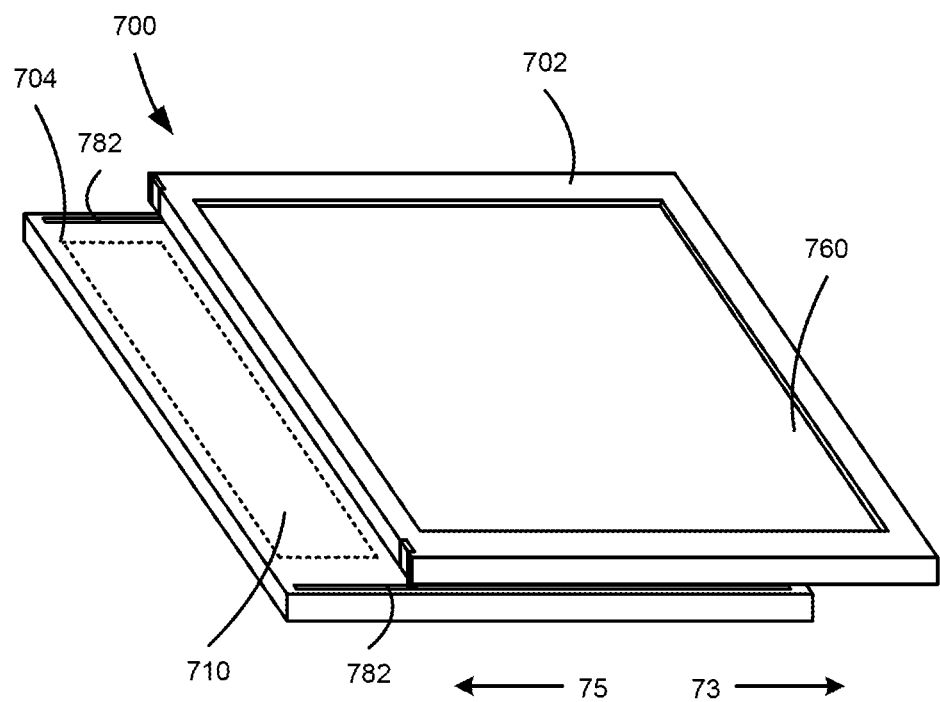
FIG. 7 is a schematic diagram that illustrates a scratch region of a computing device.

FIG. 7 is a schematic diagram that illustrates a scratch region 710 of a computing device 700. As shown in FIG. 7, the scratch region 710 spans nearly the entire length of the computing device 700. In some embodiments, the scratch region 710 can be smaller than that shown in FIG. 7, or larger than that shown in FIG. 7.

As shown in FIG. 7, the scratch region 710 is exposed so that the scratch region 710 can be used by a user of the computing device 700 when the display portion 702 of the computing device 700 is slidably moved along sliding mechanisms 782 of the computing device 700. Specifically, the scratch region 710 is exposed when the display portion 702 is moved along direction 73 so that the computing device 700 is in an open configuration. The computing device can be changed from the open configuration to a closed configuration (not shown) when the display portion 702 is moved along direction 75.

Although not shown, in some embodiments, the scratch region 710 can be configured so that at least a portion of the scratch region 710 may be activated when only a portion of the scratch region 700 is exposed. For example, the scratch region 710 can be configured so that only a portion of the scratch region 710 that is exposed is activated when the display portion 702 of the computing device 700 is moved. In some embodiments, all, or less than all, of the scratch region 710 (and associated hardware and/or software) can be activated when only a portion of the scratch region 710 is exposed for use by a user when the display portion 702 of the computing device 700 is moved.

Although not shown in FIG. 7, the scratch region 710 can be divided into several different regions with different functionality. For example, a first portion of the scratch region 710 can be configured so that a user may interact with the first portion of the scratch region 710 with a pencil. A second portion of the scratch region 710 can be configured so that a user may interact with the second portion of the scratch region 710 with a stylus and/or a finger.

In some embodiments, the scratch region 710 can be configured so that a default set of processing may be performed when a user interacts with the scratch region 710. For example, an interpretation of an indicator of an interaction with the scratch region 710 may be automatically triggered when a user interacts with the scratch region 710. In some embodiments, an interpretation of an indicator of an interaction with the scratch region 710 may be stored in a particular location, associated with a particular file type, defined as a particular file type, and/or so forth in response to a user interacting with the scratch region 710. In some embodiments, the file type can include, for example, an image file (e.g., a Joint Photographic Experts Group (JPEG) file), a text file (e.g., an American Standard Code for Information Interchange (ASCII) file, a rich text formal (RTF) file), a portable document format (pdf) file, and/or so forth. The features described in connection with FIG. 7 may be combined any of the embodiments described herein.

Figure 8A:
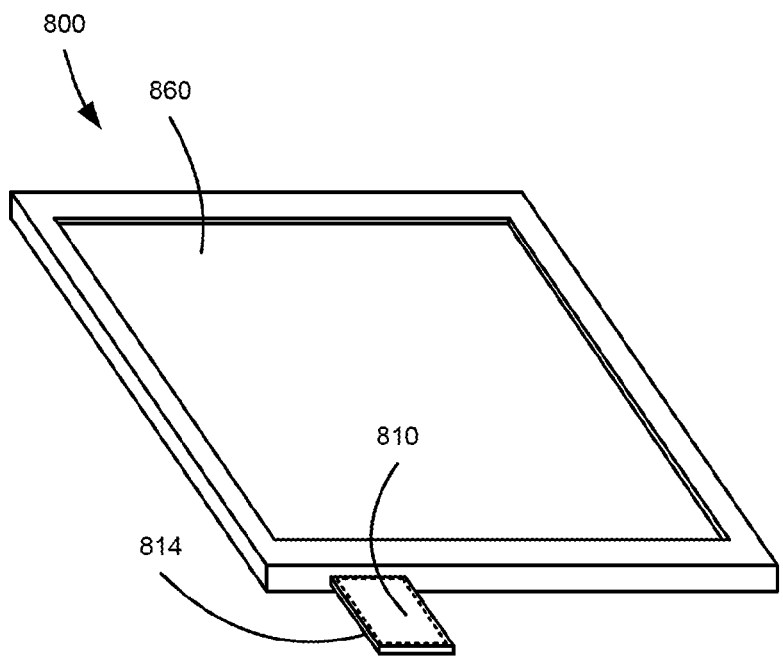
FIG. 8A is a diagram that illustrates a scratch region included in an extension of a computing device when the extension is in a deployed configuration.
Figure 8B:
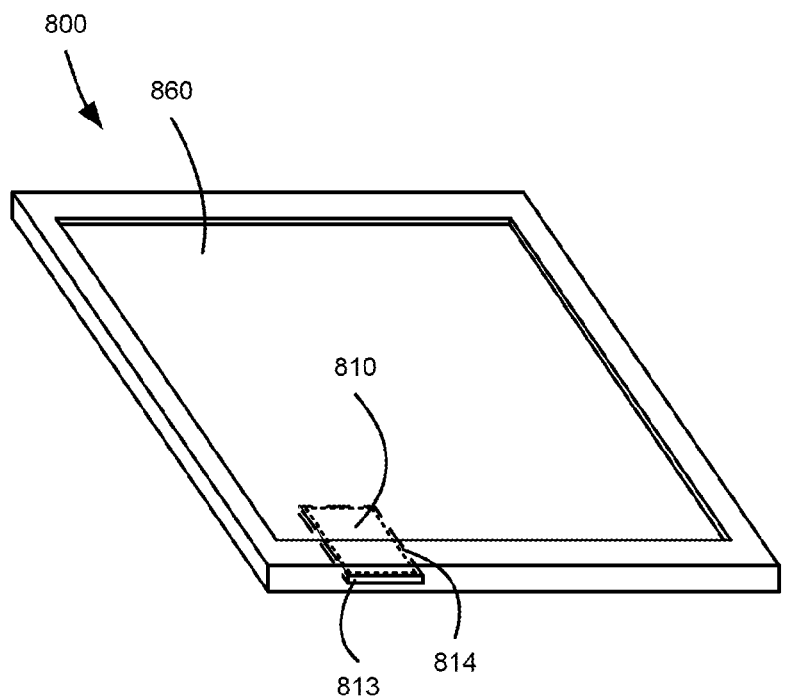
FIG. 8B is a diagram that illustrates the extension of the computing device (shown in FIG. 8A) when the extension is in a stowed configuration.

FIG. 8A is a diagram that illustrates a scratch region 810 included in an extension 814 of a computing device 800 when the extension 814 is in a deployed configuration. FIG. 8B is a diagram that illustrates the extension 814 of the computing device 800 (shown in FIG. 8A) when the extension 814 is in a stowed configuration. As shown in FIG. 8A, the computing device 800 is a tablet type computing device that has a display 860.

As shown in FIG. 8A, the scratch region 810 is exposed when the extension 814 is in the deployed configuration. The scratch region 810 is exposed so that the scratch region 810 can be used (in an active state) when the extension 814 is in the deployed configuration. In some embodiments, the scratch region 810 (e.g., the scratch region 810 and associated hardware and/or software) (i.e., scratch device) is changed from an inactive state to an active state when the extension 814 is moved from the stowed configuration (shown in FIG. 8B) to the deployed configuration (shown in FIG. 8A). For example, a scratch module associated with the scratch region 810 is changed from an inactive state to an active state when the extension 814 is moved from the stowed configuration (shown in FIG. 8B) to the deployed configuration (shown in FIG. 8A)

The scratch region 810, as shown in FIG. 8B, is hidden and cannot be used when the extension 814 is in the stowed configuration. As shown in FIG. 8B, all of the extension 814 except for an end portion 813 of the extension 814 is disposed within the computing device when the extension 814 is in the stowed configuration. Accordingly, the scratch region 810 is also disposed within the computing device 800 and is unavailable for use by a user of the computing device 800. In some embodiments, the scratch region 810 is changed from an active state to an inactive state when the extension 814 is moved from the deployed configuration (shown in FIG. 8A) to the stowed configuration (shown in FIG. 8B).

In some embodiments, the extension 814 can be changed from the stowed configuration to the deployed configuration, and/or vice versa using an instruction triggered via the computing device 800. For example, the extension 814 can be changed from the stowed configuration for the deployed configuration, and/or vice versa using a button, a command using a keyboard, and/or so forth. In some embodiments, the extension 814 can be changed from the stowed configuration to the deployed configuration, and/or vice versa, mechanically. For example, the extension 814 can be changed from the deployed configuration to the stowed configuration when a user pushes the extension 814 into the interior of the computing device 800.

In some embodiments, the scratch region 810 can be in an active state even though one or more portions of the computing device 800 remain in an inactive state (e.g., an off state, a sleep state). Accordingly, the scratch region 810 can be changed from an inactive state to an active state when deploying the extension 814, even though the remaining portions of the computing device 800 (or portions thereof) may be in an inactive state.

In some embodiments, hardware and/or software associated with the scratch region 810 can be disposed within the extension 814. Thus, at least a portion of the hardware and/or software associated with the scratch region 810 (such as portions of the scratch device 112 shown in FIG. 1) can be integrated into the extension 814.

Although not shown, in some embodiments, the extension 814 can be a standalone device that can be plugged into the computing device 800. In some embodiments, the extension 814 can be a standalone device that is configured separate from the computing device 800 (e.g., produced as a separate device from the computing device 800), and can be attached to the computing device 800. Although not shown, in some embodiments, the extension 814 can be plugged into, for example, a universal serial bus (USB) port not shown of the computing device 800, and can be activated when (or after) the extension 814 is plugged into the USB port. In some embodiments, software and or hardware that can interface with (e.g., operate with) the extension 814 (if a standalone device) can be integrated into and/or installed within the computing device 800.

Although not shown, in some embodiments, the extension 814 can be a standalone device that can be wirelessly associated with the computing device 800. In such embodiments, the extension 814 can be configured to communicate with the computing device 800 via a wireless protocol (e.g., a Bluetooth protocol). In some embodiments, software and or hardware that can interface with (e.g., operate with) the extension 814 (if functioning as a standalone wireless device) can be integrated into and/or installed within the computing device 800. For example, one or more functions associated with a scratch region analyzer can be included in the computing device 800 and can be associated with an extension 814 functioning as a standalone wireless device. In such embodiments, an interaction indicator can be generated based on an interaction with the scratch region 810 of the extension 814. The interaction indicator can be wirelessly communicated to the scratch region analyzer included in the computing device 800 and the scratch region analyzer can be configured to analyze the interaction indicator. In some embodiments, after the interaction indicator is received at the computing device 800, the interaction indicator can be represented in at least a portion of the display 860. The features described in connection with FIG. 8 may be combined any of the embodiments described herein.

Figure 9:
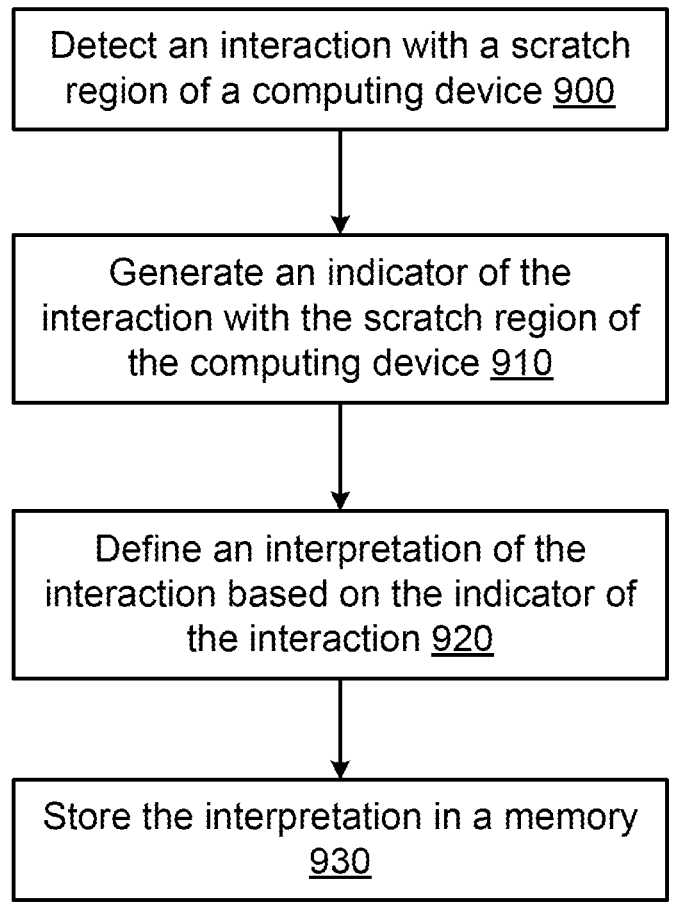
FIG. 9 is a flowchart that illustrates a method for using a scratch region of the computing device.

FIG. 9 is a flowchart that illustrates a method for using a scratch region of the computing device. As shown in FIG. 9, an interaction with the scratch region of a computing device is detected (block 900). In some embodiments, an indicator of the interaction with the scratch region can be interpreted by an interaction detection module such as interaction detection module 114 shown in FIG. 1. In some embodiments, the interaction with the scratch region can be an interaction of a pencil with a surface of the scratch region, an interaction of the finger of a user with the surface of the scratch region, and/or so forth.

In some embodiments, the scratch region can be included on an outside surface of the computing device. In some embodiments, the scratch region can be mutually exclusive from a keyboard and an electrostatic touchpad for controlling a pointing device of the computing device.

An indicator of the interaction with the scratch region of the computing device is generated (block 910). In some embodiments, the indicator of the interaction with the scratch region can be generated by an interaction detection module such as interaction detection module 114 shown in FIG. 1. In some embodiments, the indicator can be, for example, a series of binary values that represent the interaction with the scratch region.

An interpretation of the interaction is defined based on the indicator of the interaction (block 920). In some embodiments, the interpretation can be triggered in response to an instruction from a user via, for example, a keyboard. In some embodiments, the interpretation can be defined by a scratch region analyzer such as scratch region analyzer 122 of the scratch module 120 shown in FIG. 1. In some embodiments, the interpretation can be triggered by a separate interaction with the scratch region of the computing device.

The interpretation is stored in a memory (block 930). In some embodiments, the memory can be included in the computing device. Although not shown in FIG. 9, in some embodiments, the indicator of the interaction is also stored in the memory. In some embodiments, the indicator of the interaction is not stored in the memory.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user ca provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A computing device, comprising:
   a display;
   a touchpad configured for moving a cursor on the display;
   a keyboard for inputting input into the computing device;
   a scratch region mutually exclusive from the touchpad and the keyboard, the scratch region being configured to receive input to the computing device based on contact with the scratch region;
   an interaction detection module configured to detect an interaction with the scratch region, and configured to generate an indicator of the interaction; and
   a scratch region analyzer configured to define an alphanumeric character based on the indicator of the interaction with the scratch region.

2. The computing device of claim 1, further comprising:
   an extension configured to be moved from a stowed configured to a deployed configuration, the scratch region being defined within a portion of the extension,
   the scratch region analyzer being changed from an inactive state to an active state when the extension is moved from the stowed configured to the deployed configuration.

3. The computing device of claim 1, wherein the scratch region is a first scratch region defined by a first region of the computing device, the interaction is a first interaction,
   the computing device, further comprising:
   a second scratch region defined by a second region of the computing device mutually exclusive with the first region of the computing device, the interaction detection module configured to detect a second interaction and configured to generate an indicator of the second interaction,
   the scratch region analyzer configured to define an interpretation of the second interaction based on the indicator of the second interaction with the second scratch region.

4. The computing device of claim 1, further comprising:
   a first display included in a display portion of the computing device; and
   a second display included in a base portion of the computing device, the second display is configured to display a representation of the indicator of the interaction during at least a portion of a time period that the interaction with the scratch region occurs.

5. The computing device of claim 1, wherein the touchpad is disposed within a first plane co-planar with a first side of a base portion of the computing device, the scratch region is disposed within a second plane co-planar with a second side of the base portion of the computing device, the first plane is substantially parallel to the second plane.

6. The computing device of claim 1, wherein the scratch region defines an area on a base portion of the computing device,
   the computing device further comprising:
   a memory configured to store an interpretation; and
   a display portion slidably coupled to the base portion of the computing device and configured to slidably move from a first position with respect to the base portion of the computing device to a second position with respect to the base portion of the computing device, the scratch region being disposed between the base portion and the display portion when the display portion is in the first position, the scratch region being exposed when the display portion is in the second position.

7. The computing device of claim 1, further comprising:
   a display of the computing device configured to change from an illuminating mode to a non-illuminating mode; and a button configured to change the scratch region analyzer from an off-state to an on-state when the button is actuated and while the display is in the non-illuminating mode.

8. The computing device of claim 1, further comprising:
a button configured to trigger storage of the alphanumeric character as part of a note page in response to the button being actuated.

9. The computing device of claim 1, wherein:
the interaction is a first interaction,
the interaction detection module is configured to detect a second interaction with the scratch region and configured to generate an indicator of the second interaction,
the scratch region analyzer is configured to associate the indicator of the second interaction with an instruction, and
the scratch region analyzer is configured to define the alphanumeric character based on the indicator of the interaction in response to the instruction.

10. The computing device of claim 1, further comprising:
a base portion of the computing device; and
a display portion of the computing device coupled to the base portion of the computing device, the interaction detection module and the scratch region analyzer being in an active state when the display portion of the computing device and the base portion of the computing device define a closed configuration, the keyboard being disposed between the display portion of the computing device and the base portion of the computing device when the display portion of the computing device and the base portion of the computing device are in the closed configuration.

11. A computer-readable storage medium storing instructions that when executed cause a computing device to perform a process, the instructions comprising instructions to:
detect a plurality of interactions with a scratch region of the computing device, the scratch region being mutually exclusive from a touchpad for moving a cursor of the computing device and from a keyboard of the computing device;
generate an indicator of a first interaction from the plurality of interactions, and an indicator of a second interaction from the plurality of interactions;
associate the indicator of the first interaction from the plurality of interactions with an interpretation instruction; and
interpret, in response to the interpretation instruction, the second interaction from the plurality of interactions as an alphanumeric character based on the indicator of the second interaction from the plurality of interactions.

12. The computer-readable storage medium of claim 11, wherein the generating of the indicator of the first interaction and the indicator of the second interaction are performed while a display of the computing device is in an inactive state.

13. The computer-readable storage medium of claim 11, wherein the plurality of interactions is a first plurality of interactions during a first time period,
the instructions further comprising instructions to:
detect a second plurality of interactions with the scratch region of the computing device during a second time period different from the first time period;
determine that an orientation condition is unsatisfied during the second time period; and
discard the second portion of the plurality of interactions in response to the orientation condition being unsatisfied.

14. The computer-readable storage medium of claim 11, further comprising instructions to:

generate an indicator of a third interaction from the plurality of interactions;
associate the indicator of the third interaction from the plurality of interactions with a pagination instruction; and
trigger storage, in response to the pagination instruction, of the alphanumeric character as a portion of a note page.

15. The computer-readable storage medium of claim 11, further comprising instructions to:
generate an indicator of a third interaction from the plurality of interactions;
associate the indicator of the third interaction from the plurality of interactions with a delete instruction;
trigger storage of the indicator of the second interaction in a memory at a first time; and
remove, in response to the delete instruction and at a second time after the first time, the indicator of the second interaction from the memory.

16. The computer-readable storage medium of claim 11, further comprising instructions to:
associate an indicator of a teaching interaction with the interpretation instruction during a learning time period, the associating includes comparing the indicator of the first interaction with the indicator of the teaching interaction.

17. A method, comprising:
changing at least a portion of a scratch device included in a computing device from an inactive state to an active state in response to a first interaction with a scratch region of the scratch device, the changing is performed while a primary operating system of the computing device is in an inactive state;
defining an indicator of the first interaction;
defining an indicator of a second interaction with the scratch region of the scratch device; and
associating the indicator of the first interaction from the plurality of interactions with an instruction configured to trigger processing of the indicator of the second interaction from the plurality of interactions.

18. The method of claim 17, wherein the changing the at least the portion of the scratch device from the active state to the inactive state in response to the computing device being changed from an open position to a closed position.

19. The method of claim 17, further comprising:
triggering display of a representation of the indicator of the first interaction during at least a portion of a time period that the first interaction with the scratch region occurs; and
defining, in response to the instruction, an interpretation of the second interaction based on the indicator of the second interaction.

20. The method of claim 17, further comprising:
generating an image on a display of the computing device;
receiving an input from a keyboard of the computing device; and
moving a cursor on the display in response to an input from a touchpad, the scratch region of the scratch device being mutually exclusive from the touchpad and from the keyboard.

21. The method of claim 17, wherein the second interaction represents an alphanumeric character, the instruction is configured to trigger processing of the indicator of the second interaction, the first interaction is a gesture configured to trigger execution of the instruction.

* * * * *